(12) United States Patent
Ishii et al.

(10) Patent No.: US 7,544,728 B2
(45) Date of Patent: Jun. 9, 2009

(54) PRODUCTION PROCESS OF POLYPHENYLENE ETHER COMPOSITION

(75) Inventors: Tadayuki Ishii, Tokyo (JP); Kazuo Yoshida, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 360 days.

(21) Appl. No.: 11/406,253

(22) Filed: Apr. 19, 2006

(65) Prior Publication Data

US 2007/0249766 A1 Oct. 25, 2007

(51) Int. Cl.
*C08K 5/34* (2006.01)
*C08K 5/521* (2006.01)

(52) U.S. Cl. .................. 524/99; 524/100; 524/102; 524/115; 524/127

(58) Field of Classification Search ............... 524/99, 524/100, 115, 127, 102
See application file for complete search history.

(56) References Cited

U.S. PATENT DOCUMENTS

| | | | |
|---|---|---|---|
| 2,393,967 | A | 2/1946 | Merlin et al. |
| 4,843,116 | A | 6/1989 | Bopp |
| 5,026,751 | A | 6/1991 | Bopp |
| 5,159,027 | A | 10/1992 | Kanayama et al. |
| 5,214,109 | A | 5/1993 | Gallucci et al. |
| 5,216,089 | A | 6/1993 | Gallucci et al. |
| RE35,695 | E | 12/1997 | Kanayama et al. |
| 6,133,379 | A | 10/2000 | Yamagishi |
| 6,214,915 | B1 * | 4/2001 | Avakian et al. ............ 524/358 |
| 6,258,879 | B1 | 7/2001 | Adedeji et al. |
| 6,486,244 | B2 | 11/2002 | Adedeji et al. |

FOREIGN PATENT DOCUMENTS

| | | |
|---|---|---|
| JP | 59-059724 | 4/1984 |
| JP | 60-149646 | 8/1985 |
| JP | 62-283183 | 12/1987 |
| JP | 63-108059 | 5/1988 |
| JP | 63-301222 | 12/1988 |
| JP | 2-276823 | 11/1990 |
| JP | H4-117444 | 4/1992 |
| JP | H10-292053 | 11/1992 |
| JP | 7-258514 | 10/1995 |
| JP | 7-268202 | 10/1995 |
| JP | 8-183903 | 7/1996 |
| JP | 11-060934 | 3/1999 |
| JP | 11-071488 | 3/1999 |
| JP | 2000-154289 | 6/2000 |
| JP | 2002-541290 | 12/2002 |
| JP | 2005-105074 | 4/2005 |

OTHER PUBLICATIONS

English Language Abstract of JP 60-149646.
English Language Abstract of JP 62-283183.
English Language Abstract of JP 7-258514.
English Language Abstract of JP 11-060934.
English Language Abstract of JP 11-071488.
English Language Abstract of JP 2002-541290.
English Language Abstract of JP 2005-105074.
English Language Abstract of JP 7-268202.
English Language Abstract of JP 8-183903.
English Language Abstract of JP 63-301222.
English Language Abstract of JP 63-108059.
English Language Abstract of JP 2-276823.
English Language Abstract of JP 59-059724.
English Language Abstract of JP2000-154289 published Jun. 6, 2000.
English Language Abstract of JP04-117444 published Apr. 17, 1992.
English Language Abstract of JP10-292053 published Nov.4, 1992.

* cited by examiner

*Primary Examiner*—Kriellion A Sanders
(74) *Attorney, Agent, or Firm*—Greenblum & Bernstein, P.L.C.

(57) ABSTRACT

The present invention relates to a production process of polyphenylene ether composition comprising (A-1) a polyphenylene ether, (A-2) a polystyrene, (A-3) an ester phosphate, (B) a hindered amine light stabilizer, and (C) an ultraviolet absorber. The feature of the present invention is melt compounding a part of raw materials to obtain a pre-mixture at Step 1, and melt compounding the pre-mixture and the rest of the raw materials at Step 2. A polyphenylene ether composition which has a good light-discoloration resistance and causes little unmelted portion, and to a molded article formed from the polyphenylene ether composition can be obtained according to the production process of the present invention.

18 Claims, No Drawings

PRODUCTION PROCESS OF POLYPHENYLENE ETHER COMPOSITION

BACKGROUND OF THE INVENTION

1. Technical Field of the Invention

The present invention relates to a production process of a polyphenylene ether composition that has a good light-discoloration resistance and causes little unmelted portion, and to a molded article formed from the polyphenylene ether composition.

2. Prior Art

A polyphenylene ether composition has heat resistance, which is arbitrarily determined according to an incorporation ratio of polyphenylene ether to polystyrene. The composition also has excellent properties such as insulation properties, dimensional stability, impact resistance, acid resistance, alkali resistance, low water absorbability, and low density. Further, it is good for the environment and excellent in safety and health because the flame retardancy can be imparted to the polyphenylene ether composition by incorporating a phosphorus or silicone compound instead of a halogen-type compound and antimony trioxide, which are assumed harmful. These excellent properties enable the polyethylene ether composition to apply to various uses such as electric and electronic components, office equipment parts, various kinds of housing materials, and industrial articles.

However, the polyphenylene ether composition has a drawback that is easy to discolor when exposed to light. In particular, it is disadvantageous in that it is likely to turn yellow with ultraviolet rays. Thus, its use is limited when it is colored to a chromatic color, especially a light color like white. Further, the polyphenylene ether composition does not exhibit sufficient releasability from a mold upon mold processing of a large-scale molded part, such as housing for office equipment like a printer, a fax machine, a copy machine, a multiple copy machine, or housing for a television.

In the past, various technologies were developed to improve the light-discoloration resistance of polyphenylene ether compositions. It has been commonly known to add an ultraviolet absorber such as a benzotriazole compound and a benzophenone compound and a hindered amine light stabilizer to the polyphenylene ether composition. Also, there has been disclosed the following technologies:

to use a hindered amine light stabilizer and a specific epoxy compound in combination (Patent Document 1);

to use a benzophenone compound, a hindered amine light stabilizer and a cyclic fatty acid epoxy compound in combination (Patent Document 2);

to use a specific benzotriazole compound and a hindered amine light stabilizer in combination (Patent Document 3);

to use a benzotriazole and an epoxy compound in combination (Patent Document 4); and to use a mixture comprising 15 to 35 parts by mass of polyphenylene ether and 85 to 65 parts by mass of polystyrene, an ultraviolet absorber such as a benzotriazole compound and a benzophenone compound, a hindered amine light stabilizer, and a specific epoxy compound in combination (Patent Document 5).

However, no detailed definition to the production process has been given in these technologies to improve the light-discoloration resistance. Patent Document 6 discloses a production process of a polyphenylene ether composition, but not describe the light-discoloration resistance, and the process disclosed therein is not sufficient enough to achieve good light-discoloration resistance. The light-discoloration resistance of the resin composition is greatly influenced by a production process. For example, in the case that all raw materials are incorporated in one step and then melt compounded with a twin-screw extruder or the like, the extrusion temperature of polyphenylene ether is necessary to be preset at a high temperature. Especially, when a large amount of a liquid flame retardant is incorporated, the flame retardant is difficult to melt unless otherwise side-fed using liquid-feeding equipment. In this case, it is necessary to preset the extrusion temperature at 320° C. or higher. At such a high extrusion temperature, the temperature of the resin composition may reach 350° C. The light-discoloration agent volatilizes at such a high temperature of the resin composition, and the intrinsic light-discoloration resistance cannot be achieved.

When the extrusion temperature is adjusted to 300° C. or lower to prevent the volatilization, polyphenylene ether does not melt completely and an unmelted portion remains. As a result, problems are caused, such as deterioration of the impact resistance and defective appearance of the molded article, which occurs upon the molding processing. To melt polyphenylene ether completely, it is necessary to take some measures, such as reduction of the production rate. Also, the composition containing a smaller amount of polyphenylene ether hardly generates shear heat so that polyphenylene ether is harder to melt and an unmelted portion is more likely to remain. If a side-feeding location of the flame retardant is set downstream of the streamline in order to make polyphenylene ether easy to melt, the flame retardant may not be compounded with the resin completely. As the result, a liquid material spouts out of a dice part of the extruder, and stable production cannot be performed, owing to strand breakage or the like. Furthermore, there are problems in reduction of flame retardancy caused by the failure to incorporate the flame retardant in the prescribed amount. Therefore, there has been a demand for technologies that further improve the light-discoloration resistance.

[Patent Document 1] Japanese Patent Application Laid-Open No. S60-149646

[Patent Document 2] Japanese Patent Application Laid-Open No. S62-283183 (corresponding to U.S. Pat. Nos. 4,843,116, and 5,026,751)

[Patent Document 3] Japanese Patent Application Laid-Open No. H07-258514

[Patent Document 4] Japanese Patent Application Laid-Open No. H11-60934

[Patent Document 5] Japanese Patent Application Laid-Open No. H11-71488

[Patent Document 6] Japanese Patent Application Laid-Open No. 2002-541290 (corresponding to U.S. Pat. Nos. 6,258,879, and 6,486,244)

SUMMARY OF THE INVENTION

Problems to be Solved by the Invention

It is an object of the present invention to provide a production process of a polyphenylene ether composition that is remarkably excellent in light-discoloration resistance and friendly to environment, and causes little unmelted portion; and to provide an article formed from the polyphenylene ether composition.

Means of Solving the Problems

The present inventors have made extensive and intensive studies. As a result, it has been found that the above-mentioned problems can be solved by melt compounding a polyphenylene ether, a portion of a polystyrene, and an ester phosphate, preliminarily to obtain a pre-mixture; and then melt compounding the pre-mixture, the rest of the polystyrene, a hindered amine light stabilizer, and an ultraviolet absorber. Based on this finding, the present invention has been accomplished.

Namely, the present invention is as follows:
1. A production process of polyphenylene ether composition comprising:
   (A-1) a polyphenylene ether,
   (A-2) a polystyrene,
   (A-3) an ester phosphate,
   (B) a hindered amine light stabilizer, and
   (C) an ultraviolet absorber;

which production process comprises the steps of:
   Step 1: melt compounding components (A-1), (A-2'), which is a portion of component (A-2), and component (A-3) to obtain (A) a pre-mixture; and
   Step 2: melt compounding the pre-mixture (A), (A-2"), which is the rest of component (A-2), and components (B) and (C).
2. The production process of polyphenylene ether composition according to item 1, which composition contains the following components in the amount below, based on 100 parts by mass of the total of components (A-1) and (A-2):
   (A-1) 10 to 45 parts by mass,
   (A-2) 55 to 90 parts by mass,
   (A-3) 2 to 35 parts by mass,
   (B) 0.03 to 5 parts by mass, and
   (C) 0.01 to 3 parts by mass.
3. The production process of polyphenylene ether composition according to item 1, wherein the mass ratio of component (A-1) to component (A-2') at Step 1 is from 46/54 to 90/10.
4. The production process of polyphenylene ether composition according to item 1, wherein the melt compounding at Step 2 is conducted at the absolute pressure of 300 hPa or more, while degassing.
5. The production process of polyphenylene ether composition according to item 1, wherein the temperature of a heating cylinder at Step 2 is adjusted to 200 to 320° C.
6. The production process of polyphenylene ether composition according to item 1, wherein component (A-3) is a condensed ester phosphate represented by the following formula (I) or (II):

wherein each of Q1, Q2, Q3 and Q4 is a substituent and independently represents an alkyl group having 1 to 6 carbon atoms; each of R1 and R2 independently represents a methyl group; each of R3 and R4 independently represents a hydrogen atom or a methyl group; n is an integer of 1 or more; each of n1 and n2 independently represents an integer of 0 to 2; and each of m1, m2, m3 and m4 independently represents an integer of 0 to 3.

7. The production process of polyphenylene ether composition according to item 1, further comprising 0.1 to 5 parts by mass of (D) a polyolefin based on 100 parts by mass of the total of components (A-1) and (A-2).
8. The production process of polyphenylene ether composition according to item 1, wherein component (D) is an ethylene-propylene copolymer.
9. The production process of polyphenylene ether composition according to item 1, further comprising 0.1 to 5 parts by mass of (E) a styrene block copolymer based on 100 parts by mass of the total of components (A-1) and (A-2).
10. The production process of polyphenylene ether composition according to item 1, further comprising 0.1 to 3 parts by mass of (F) an epoxidized soybean oil based on 100 parts by mass of the total of components (A-1) and (A-2).
11. The production process of polyphenylene ether composition according to item 1, wherein the mass ratio of component (B) to component (C) is 70/30 to 95/5 and the total of components (B) and (C) is 0.05 to 5 parts by mass based on 100 parts by mass of the total of components (A-1) and (A-2).
12. The production process of polyphenylene ether composition according to item 1, further comprising 1.0 to 10 parts by mass of a titanium dioxide.
13. A molded article formed from the polyphenylene ether composition produced by the production process of item 1.
14. A television housing formed from the polyphenylene ether composition produced by the production process of item 1.

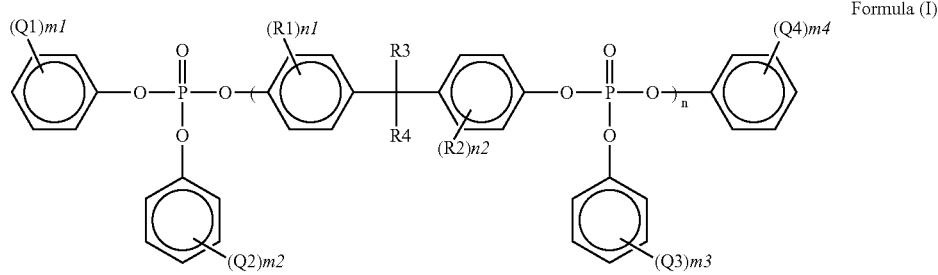

Formula (I)

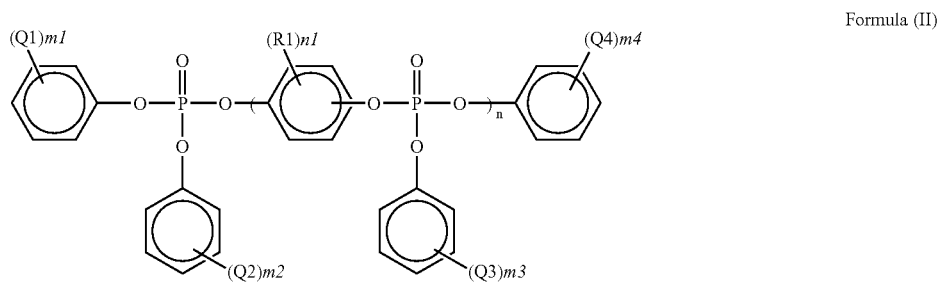

Formula (II)

15. An office equipment housing formed from the polyphenylene ether composition produced by the production process of item 1.
16. Any one of housings for a printer, a fax machine, a copy machine, and a multiple copy machine, formed from the polyphenylene ether composition produced by the production process of item 1.

Effect of the Invention

According to the present invention, there is provided a production process of a polyphenylene ether composition that is excellent in a light-discoloration resistance and friendly to environment, and causes little unmelted portion.

DETAILED DESCRIPTION OF THE INVENTION

Most Preferred Embodiment for Carrying Out the Invention

The present invention will be explained in more detail below.

The polyphenylene ether (A-1) used in the present invention is a homopolymer or a copolymer comprising recurring units each independently represented by the following formula (III) and/or (IV):

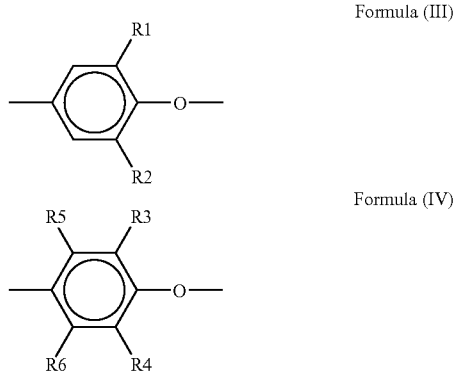

Formula (III)

Formula (IV)

wherein each of R1, R2, R3, R4, R5 and R6 independently represents a hydrogen atom, an alkyl group having 1 to 4 carbon atoms, an aryl group having 6 to 9 carbon atoms, or halogen atom, with the proviso that R5 and R6 are not simultaneously hydrogen atoms.

Representative examples of the homopolymer of the polyphenylene ether include poly(2,6-dimethyl-1,4-phenylene) ether, poly(2-methyl-6-ethyl-1,4-phenylene) ether, poly(2,6-diethyl-1,4-phenylene) ether, poly(2-ethyl-6-n-propyl-1,4-phenylene) ether, poly(2,6-di-n-propyl-1,4-phenylene) ether, poly(2-methyl-6-n-butyl-1,4-phenylene) ether, poly(2-ethyl-6-isopropyl-1,4-phenylene) ether, poly(2-methyl-6-chloroethyl-1,4-phenylene) ether, poly(2-methyl-6-hydroxyethyl-1,4-phenylene) ether, and poly(2-methyl-6-chloroethyl-1,4-phenylene) ether.

The polyphenylene ether copolymer indicates a copolymer containing the recurring units represented by the formula (III) and/or (IV) as a main recurring unit. Examples of the polyphenylene ether copolymers include a copolymer of 2,6-dimethylphenol and 2,3,6-trimethylphenol, a copolymer of 2,6-dimethylphenol and o-cresol, and a copolymer of 2,6-dimethylphenol, 2,3,6-trimethylphenol and o-cresol.

Of these polyphenylene ethers, poly(2,6-dimethyl-1,4-phenylene) ether is preferred. Particularly preferred is polyphenylene ether containing a 2-(dialkylaminomethyl)-6-methylphenylene ether unit or a 2-(N-alkyl-N-phenylaminomethyl)-6-methylphenylene ether unit as a part of the structure as disclosed in Japanese Patent Application Laid-Open No. S63-301222 and the like. The reduced viscosity (unit: dl/g; as measured in a chloroform solution having a temperature of 30° C.) of polyphenylene ether is preferably 0.25 to 0.6, more preferably 0.35 to 0.55.

In the present invention, there can be used a modified polyphenylene ether, which is produced by modifying a part of or the whole polyphenylene ether with an unsaturated carboxylic acid or a derivative thereof. Such a modified polyphenylene ether is disclosed, for example, in Japanese Patent Application Laid-Open No. H02-276823 (corresponding to U.S. Pat. No. 5,159,027 and RE35695), Japanese Patent Application Laid-Open No. S63-108059 (corresponding to U.S. Pat. Nos. 5,214,109 and 5,216,089) and Japanese Patent Application Laid-Open No. S59-59724. The modified polyphenylene ether can be produced, for example, by melt compounding polyphenylene ether with an unsaturated carboxylic acid, or a derivative thereof, in the presence or absence of a radical initiator to react them. Alternatively, it can be produced by dissolving polyphenylene ether and an unsaturated carboxylic acid, or a derivative thereof, in an organic solvent in the presence or absence of a radical initiator to react them in a solution.

Examples of the unsaturated carboxylic acids and the derivatives thereof include dicarboxylic acids such as maleic acid, fumaric acid, itaconic acid, halogenated maleic acid, cis-4-cyclohexene-1,2-dicarboxylic acid, and endo-cis-bicyclo(2,2,1)-5-heptene-2,3-dicarboxylic acid; anhydrides, esters, amides, and imides of the dicarboxylic acids; monocarboxylic acids, such as acrylic acid and methacrylic acid; and esters and amides of the monocarboxylic acids. Further, a saturated carboxylic acid can be also used if it is thermally self-decomposed at a reaction temperature at which a modified polyphenylene ether is produced and converted to a derivative of the unsaturated carboxylic acid to be used in the present invention. Specific examples of such saturated carboxylic acids include malic acid and citric acid. They may be used individually or in combination.

In the present invention, the polystyrene (A-2) indicates a polymer obtained by polymerizing a styrene compound in the presence or absence of a rubbery polymer, or by copolymerizing a styrene compound and a compound copolymerizable therewith in the presence or absence of a rubbery polymer. Specific examples of the styrene compounds include styrene, α-methylstyrene, 2,4-dimethylstyrene, monochlorostyrene, p-methylstyrene, p-tert-butylstyrene, and ethylstyrene. Of these, styrene is the most preferred. Examples of the compounds copolymerizable with styrene compounds include methacrylate esters, such as methyl methacrylate and ethyl methacrylate; unsaturated nitrile compounds, such as acrylonitrile and methacrylonitrile; and acid anhydrides, such as maleic anhydride. These copolymerizable compounds are used in combination with the styrene compounds. The amount of the copolymerizable compound is preferably 20% by mass or less, more preferably 15% by mass or less, based on the total amount of the styrene compound and the compound copolymerizable therewith.

Examples of the rubbery polymers include conjugated diene rubbers, copolymers of conjugated diene and aromatic vinyl compound, and rubbery copolymers of ethylene and propylene copolymer. Specifically, polybutadiene and styrene-butadiene copolymers are preferred. Further, it is particularly preferred to use, as a rubbery polymer, a partially hydrogenated polybutadiene having a degree of unsaturation of 80 to 20% or a polybutadiene containing cis 1,4-bonds at a content of 90% or more. Specific examples of the polystyrene include a polystyrene, a rubber-reinforced polystyrene, a styrene-acrylonitrile copolymer (AS resin), a rubber-reinforced styrene-acrylonitrile copolymer (ABS resin), and other styrene copolymers. Particularly preferred is the partially hydrogenated polybutadiene having a degree of unsaturation of 80 to 20% and a polybutadiene containing cis 1,4-bonds at a content of 90% or more.

When the polyphenylene ether composition is used for housings for office equipment such as a printer, a fax machine, a copy machine, and a multiple copy machine, or a television, the mass ratio of component (A-1)/component (A-2) is in the range of 45/55 to 10/90, preferably 40/60 to 20/80. The ester phosphate (A-3) is added to improve the flame retardancy. Any organic ester phosphate, which is commonly used as a flame retardant for the polyphenylene ether, can be employed for the ester phosphate. Preferred are condensed phosphoric acid esters represented by the following formula (I) or (II). The condensed phosphoric acid esters may be used individually or in combination.

the above-mentioned flame-retardants are commercially available, and CR-741, CR-733S, and PX-200 (trade names), which are manufactured by Daihachi Chemical Industry Co., Ltd., Japan, are exemplified.

In the case of large molded parts for housings of office equipment and a television, they are often assembled by tightening tapping screws, and therefore, a material that has excellent self-tapping properties is particularly desired. A higher self-tapping property is achieved by using bisphenol A bisdiphenyl phosphate or resorcinol bisdikylyl phosphate as a phosphoric acid ester, and thus, they are particularly preferred. The amount of component (A-3) to be added varies depending on the required level of flame retardancy. It is generally from 2 to 35 parts by mass, preferably from 5 to 25 parts by mass, based on 100 parts by mass of the total of components (A-1) and (A-2).

The composition of the present invention preferably incorporates a drip inhibitor. The drip inhibitor is such an additive that has a function to prevent dripping upon combustion, and

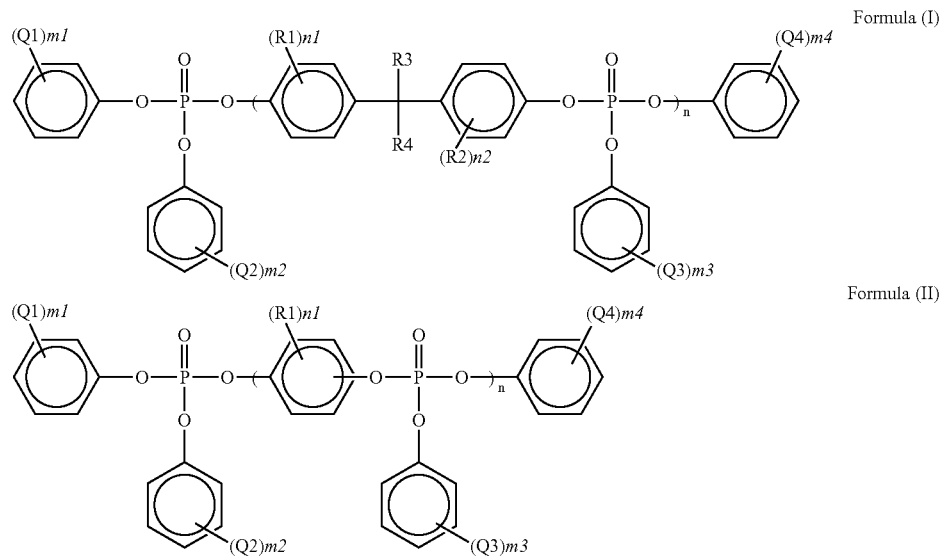

wherein each of Q1, Q2, Q3, and Q4 is a substituent and independently represents an alkyl group having 1 to 6 carbon atoms; each of R1 and R2 independently represents a methyl group; each of R3 and R4 independently represents a hydrogen atom or a methyl group; n is an integer of 1 or more; each of n1 and n2 independently represents an integer of 0 to 2; and each of m1, m2, m3, and m4 independently represents an integer of 0 to 3.

Each of the condensed phosphoric acid esters represented by the above formula (I) or (II) comprises a plurality of molecular chains. In each molecular chain, n represents an integer of 1 or more, preferably 1 to 3.

Among the above-mentioned condensed phosphoric acid esters, preferred are ones represented by the formula (I) wherein each of m1, m2, m3, m4, n1, and n2 is 0, and each of R3 and R4 represents a methyl group; and ones represented by the formula (I) wherein each of the substituents Q1, Q2, Q3 Q4, R3, and R4 is a methyl group, each of n1 and n2 is 0, and each of m1, m2, m3, and m4 is an integer of 1 to 3; in both of which n is from 1 to 3. Especially, ones containing 50% or more by mass of the phosphoric acid ester represented by the formula (I) wherein n is 1 is particularly preferred. In general, the conventional ones can be used. The drip inhibitor is added in an amount of 0.01 to 5 parts by mass, preferably 0.05 to 3 parts by mass, based on 100 parts by mass of the total of components (A-1) and (A-2). In the present invention, a drip inhibitor represented by polytetrafluoroethylene (PTFE) and the like, which forms a fibril structure in the polyphenylene ether is particularly preferred because it inhibits dripping efficiently. Resin compositions containing such a drip inhibitor are especially excellent in flame retardancy. Among the PTFEs, those having excellent dispersibility, for example, one prepared by emulsifying and dispersing PTFE in a solution such as water, and one prepared by encapsulating PTFE with, for example, an acrylic ester type resin, a methacrylic acid ester type resin and resins represented by a styrene-acrylonitrile copolymer are preferable because they give good surface appearance to molded articles made of the polyphenylene ether composition.

As long as PTFE is emulsified and dispersed in a solution such as water, there is no specific limitation. Preferred is PTFE having an average particle diameter of 1 to 0.05 μm. More preferred is one having an average diameter of 0.5 to 0.05 μm. Specific examples of commercially available PTFE include Teflon 30J® (manufactured by DuPont-Mitsui Fluorochemicals Co., Ltd.), Polyflon D-2C (trade name, manufactured by DAIKIN INDUSTRIES, LTD.), Aflon AD1 (trade name, manufactured by ASAHI GLASS CO., LTD.), and the like.

Further, the PTFE can be produced by a conventional method (see U.S. Pat. No. 2,393,967). Specifically, the PTFE as a white color solid can be obtained by polymerizing a tetrafluoroethylene using a free-radical catalyst such as a sodium peroxydisulfate, potassium peroxydisulfate, and ammonium peroxydisulfate, in an aqueous solvent under the pressure of 0.7 to 7 MPa at the temperature of 0 to 200° C., preferably 20 to 100° C. The number average molecular weight of the resultant PTFE is preferably 100,000 or more, more preferably 200,006 to 3,000,000.

For the hindered amine light stabilizer (B) of the present invention, commercially available ones can be used. Examples of component (B) include
bis(2,2,6,6-tetramethyl-4-piperidyl)sebacate,
bis(1-octyloxy-2,2,6,6-tetramethyl-4-piperidyl)sebacate, a polycondensation of dimethyl succinate and 1-(2-hydroxyethyl)-4-hydroxy-2,2,6,6-tetramethylpiperidine,
poly[{6-(1,1,3,3-tetramethylbutyl)amino-1,3,5-triazine-2,4-diyl}{(2,2,6,6-tetramethyl-4-piperidyl)imino} hexamethylene{(2,2,6,6-tetramethyl-4-piperidyl)imino}], a condensation of N,N'-bis(3-aminopropyl)ethylenediamine and
2,4-bis[N-butyl-N-(1,2,2,6,6-pentamethyl-4-piperidyl) amino]-6-chloro-1,3,5-triazine,
1,2,3,4-tetra(2,2,6,6-tetramethyl-4-piperidyl)-butantetracarboxylate,
1,4-bis(2,2,6,6-tetramethyl-4-piperidyl)-2,3-butanedione,
tris-(2,2,6,6-tetramethyl-4-piperidyl)trimellitate, 1,2,2,6,6-pentamethyl-4-piperidyl-n-octoate,
1,2,2,6,6-pentamethyl-4-piperidylstearate, 4-hydroxy-1,2,2,6,6-pentamethylpiperidine,
bis(1,2,2,6,6-pentamethyl-4-piperidyl)sebacate,
bis(1,2,2,6,6-pentamethyl-4-piperidyl)-2-(3,5-t-butyl-4-hydroxybenzyl)-2-n-butylmaleate, and the like. Component (B) can be used individually or in combination of two or more types thereof.

The amount of component (B) to be added is from 0.03 to 5 parts by mass, preferably from 0.05 to 3 parts by mass, based on 100 parts by mass of the total of components (A-1) and (A-2).

Examples of the ultraviolet (UV) absorber (C) to be used in the present invention include benzotriazole UV absorbers, benzophenone UV absorbers, salicylate UV absorbers, cyanoacrylate UV absorbers, nickel complex UV absorbers, and the like. The benzotriazole UV absorbers and benzophenone UV absorbers are especially preferable.

For the benzotriazole UV absorbers, commercially available ones can be used. Examples thereof include a 2-(2'-hydroxy-5'-methylphenyl)benzotriazole, a
2-(3-t-butyl-5-methyl-2-hydroxyphenyl)-5-chlorobenzotriazole, a
2-(2'-hydroxy-3',5'-di-t-butylphenyl)benzotriazole, a
2-(2'-hydroxy-5'-t-octylphenyl)benzotriazole, a
2-(2'-hydroxy-3'-t-butyl-5'-methylphenyl)-5-chlorobenzotriazole, a
2-(2'-hydroxy-3',5'-di-t-butylphenyl)-5-chlorobenzotriazole, a
2-(2'-hydroxy-3',5'-di-t-aminophenyl)benzotriazole, a
2-{2'-hydroxy-3'-(-3",4",5",6"-tetrahydrophthalimidemethyl)-5'-methylphenyl}benzotriazole,
2,2-methylenebis {4-(1,1,3,3-tetramethylbutyl)-6-(2H-benzotriazole-2-yl)phenol}, a
6-(2-benzotriazolyl)-4-t-octyl-6'-t-butyl-4'-methyl-2,2'-methylenebisphenol, and the like.

For the benzophenone UV absorbers, commercially available ones can be used. Examples thereof include a 2-hydroxy-4-n-octoxybenzophenone,
2,2'-dihydoroxy-4-methoxybenzophenone, 2,2'-dihydroxy-4,4'-dimethoxybenzophenone,
2,2',4,4'-tetrahydroxybenzophenone, 2-hydroxy-4-methoxybenzophenone,
2,4-dihydroxybenzophenone, 2-hydroxy-4-octyloxybenzophenone, and the like. The amount of component (C) to be added in the present invention is from 0.01 to 3 parts by mass, preferably from 0.03 to 1 part by mass, based on 100 parts by mass of the total of components (A-1) and (A-2).

In the present invention, it is preferable that the polyphenylene ether composition further contains the polyolefin resin (D). Examples of component (D) to be used in the present invention include a low density polyethylene, a high density polyethylene, a linear low density polyethylene, polypropylene, an ethylene-propylene copolymer, an ethylene-butene copolymer, an ethylene-octene copolymer, and an ethylene-acrylic ester copolymer. Of these, a low-density polyethylene and an ethylene-propylene copolymer are preferred. Each of the ethylene-propylene copolymer, an ethylene-butene copolymer, an ethylene-octene copolymer and an ethylene-acrylic ester copolymer is generally an amorphous or low-crystalline copolymer. Each of these copolymers may have a third component copolymerized into it, so long as the performance of the copolymer is not adversely affected. In the copolymer, the unit ratio of ethylene monomer to propylene, butene or octene monomer is not particularly limited, but the content of the propylene, butene, or octene monomer unit therein is generally in the range of 5 to 50 mol %. The above-mentioned olefin resins can be used in combination.

The melt flow rate (MFR) of the polyolefin resin is measured according to ASTM D-1238 with a cylinder temperature of 230° C., and is preferably from 0.1 to 50 g/10 min, more preferably from 0.2 to 20 g/10 min.

The amount of component (D) to be added is 5 parts by mass or less, preferably from 0.1 to 5 parts by mass, more preferably from 0.1 to 3 parts by mass, based on 100 parts by mass of the total of components (A-1) and (A-2).

In the present invention, it is preferable that the polyphenylene ether composition further contains the styrene block copolymer (E). Component (E) indicates a copolymer having a styrene block chain.

Particularly preferable component (E) is a hydrogenated block copolymer comprising a styrene and conjugated diene. The hydrogenation ratio of unsaturated bonds derived from the conjugated diene is preferably 60% or more, more preferably 80% or more. Component (E) has the configuration represented by the formula S—B—S, S—B—S—B, (S—B—)$_4$—Si, S—B—S—B—S, or the like (wherein S represents a styrene block chain, and B represents a conjugated diene block chain). The microstructure of the polymerized conjugated diene block can be arbitrarily selected. In general, the content of 1,2-vinyl bond ranges from 2 to 60%, preferably from 8 to 40% relative to the whole bonds of the polymerized conjugated diene. In the hydrogenated block copolymer, the mass ratio of the polymerized styrene block to the polymerized conjugated diene block does not matter. However, the amount of the polymerized styrene block in the styrene block copolymer is preferably from 25 to 80% by mass, more preferably from 30 to 70% by mass, based on the total mass of the polymerized styrene block and the polymerized conjugated diene block.

The component (E) to be used in the present invention contains at least one styrene block chain having a number average molecular weight of 15,000 or more, preferably 20,000 to 50,000. It is particularly preferable that all the polymerized styrene block chain in the block copolymer has a number average molecular weight of 15,000 or more.

The number average molecular weight of component (E) is preferably 30,000 or more, more preferably 50,000 to 400,000.

The amount of component (E) to be added is 5 parts by mass or less, preferably 0.1 to 5 parts by mass, more preferably 0.1 to 3 parts by mass, based on 100 parts by mass of the total of components (A-1) and (A-2).

Component (E) can be used in combination of two or more types.

In the present invention, it is preferable that the polyphenylene ether composition further contains the epoxidized soybean oil (F). Component (F) preferably contains oxirane oxygen in an amount of 6% or more. The amount of component (F) to be added is 3 parts by mass or less, preferably 0.1 to 3 parts by mass, more preferably 0.1 to 2 parts by mass, based on 100 parts by mass of the total of components (A-1) and (A-2).

In the case that component (F) is incorporated, using components (B) and (C) at a specific mass ratio further enhances the light-discoloration resistance and markedly reduces deposit on the surface of a metal mold generated at the molding process. In this case, the mass ratio of component (B)/component (C) is preferably from 50/50 to 99/1, more preferably form 70/30 to 95/5. The total amount of components (B) and (C) to be added is preferably from 0.05 to 5 parts by mass, more preferably from 0.2 to 3 parts by mass, based on 100 parts by mass of the total of components (A-1) and (A-2).

The resin composition of the present invention preferably contains, as a colorant, a titanium dioxide in an amount of preferably 1 part by mass or more, more preferably 2.0 to 10 parts by mass. The composition is suitably used as a light-colored material that requires light-discoloration resistance. It exhibits excellent light-discoloration resistance even when colored into bright color by adding titanium dioxide as a white colorant in an amount of 1 part by mass or more, specifically 2 parts by mass or more, based on 100 parts by mass of the total of components (A-1) and (A-2).

In general, a light-colored, for instance, light gray or ivory, flame-retardant resin is used for a housing of office equipment such as a copy machine, a multiple copy machine, a printer, a fax machine, and a personal computer, or a television. These light-colored, flame-retardant resins, are considerably discolored by light, compared to a black or dark gray flame-retardant resin. The light-discoloration resistance is a very important property from the viewpoint of a commercial value. The resin composition of the present invention is a material suitably used for a light-colored housing of office equipment or a television, particularly for a housing colored into light gray or ivory by incorporating 2 parts by mass or more of titanium dioxide in the resin composition.

Incorporation of an inorganic filler such as a glass fiber, a glass flake, kaolin clay, and talc, or other fibrous reinforcing agent into the polyphenylene ether composition of the present invention can provide a high-strength material having excellent fluidity and heat resistance. For imparting properties other than those mentioned above to the polyphenylene ether composition of the present invention, other additives such as a plasticizer, an antioxidant, various stabilizers, an antistatic agent, a mold release agent, a dye, a pigment, and other resins can be added in the range where the essential effects of the present invention are not impaired. The flame retardancy of the polyphenylene ether composition of the present invention can be further improved by adding various flame-retardants or auxiliary flame-retardants conventionally used, for example, hydroxides such as magnesium hydroxide and aluminum hydroxide, which contain crystallization water, zinc borate compounds, zinc stannate compounds, and inorganic silicon compounds, such as silica, kaolin clay, and talc.

As used herein, the term "a resin composition which has substantially no unmelted portion" means a resin composition that contains an unmelted portion of the polyphenylene ether in 10 or less, preferably 3 or less per thin film having a size of 200 mm×200 mm, which film is prepared by molding pellets of the resin composition so as to be 0.03 to 0.1 mm thick. The number of the unmelted portion is determined by visually observing polyphenylene ether remaining in the form of a particle in the thin film. The term "unmelted portion" means polyphenylene ether that is not completely melted and remains as a particle in the obtained resin composition.

The thin film is prepared by a compression-molding machine and a vacuum-molding machine. First, the resin composition pellets are molded into a plate having a size of 220 mm×220 mm and a thickness of 1 mm by the compression-molding machine, which is preset at 250° C. Then, the resultant plate is formed into a box shape having a size of 200 mm×200 mm×150 mm by the vacuum molding machine under the conditions that a forming temperature and a molding rate are adjusted so that the bottom of the box-shaped molded article become a thin wall having a thickness of 0.03 to 0.1 mm. The thin-walled bottom of the box-shaped molded article is cut out to be a thin film having a size of 200 mm×200 mm and a thickness of 0.03 to 0.1 mm.

The present invention relates to a production process of polyphenylene ether composition comprising the following steps:

Step 1: melt compounding component (A-1), (A-2'), which is a portion of component (A-2), and component (A-3) to obtain (A) a pre-mixture; and Step 2: melt compounding the pre-mixture (A), (A-2"), which is the rest of component. (A-2), and components (B) and (C).

If components (D), (E), and (F) are used, they can be added at any time and may be added at one time or in portions.

The kneader used for producing the polyphenylene ether composition of the present invention is not particularly limited. There can be used an extruder, a heating roll, a kneader, a Banbury mixer and the like for the production. Of these, kneading by an extruder is preferable from the viewpoint of productivity.

The pre-mixture (A) herein means a mixture obtained by preliminarily melt compounding component (A-1), component (A-2'), which is a portion of component (A-2), and component (A-3) at Step 1.

In the production process of the pre-mixture (A) at Step 1, a twin-screw extruder with a side-feed equipment is used and the whole amount of component (A-1) and component (A-2') are fed from the first feed port located upstream of the streamline. The mass ratio of component (A-1)/component (A-2') is preferably from 35/65 to 99/1, more preferably 46/54 to 90/10, further more preferably form 50/50 to 80/20. Component (A-2') is preferably further fed dividedly from the feed port arranged downstream of the first feed port. Component (A-3) is side-fed from at least one feed port located downstream.

Component (A-3) is side-fed according to the following methods. In the case of liquid, component (A-3) is fed from an injection nozzle located at the side of an extruder using a gear pump or a plunger pump. In the case of solid, it can be side fed from the first feed port located upstream of streamline or from at least one feed port located downstream. According to the present invention, component (A-3) is more easily compounded compared to the conventional method.

The temperature of heat cylinder for kneading the mixture at Step 1 may be set at a temperature suitable for the melt compounding of the pre-mixture (A), preferably in the range of 280 to 370° C., more preferably 300 to 350° C. In the course of preparing the pre-mixture (A), degassing is preferably conducted to remove volatile components contained in the raw material, such as the components (A-1), (A-2'), and (A-3), or generated by decomposition, or the like, upon extrusion. The volatile component is degassed from at least one degassing port arranged downstream of the first feed port. The pressure for degassing is an absolute pressure of 600 hPa or less, more preferably 300 hPa or less, further more preferably 100 hPa or less.

At Step 2, the pre-mixture (A) obtained at Step 1, component (A-2"), which is the rest of component (A-2), and components (B) and (C) are compounded.

The amount of component (A-2") is determined as being the rest of the amount of component (A-2) after component (A-2') is incorporated in a suitable amount relative to component (A-1).

The kneader used for the melt compounding at Step 2 is preferably a single-screw extruder or twin-screw extruder. In the course of the melt compounding at Step 2, all raw materials may be fed at one time from upstream of the extruder, or side-fed dividedly from the first feed port located upstream of streamline and at least one feed port located downstream.

The pre-mixture obtained in Step 1 may be used at Step 2 in the form of pellets prepared by extrusion pelletizing or in the molten state as is obtained.

In case there is a demand for more excellent properties, the components (D), (E), and (F), titanium dioxide and other additives are added and melt compounded as needed in order to obtain a resin composition having higher properties. Further, component (A-3) may be also added at Step 2. Component (A-3) is side-fed from at least one feed port arranged downstream as well as at Step 1, or it may be side-fed from the feed port located upstream of streamline together with the pre-mixture. However, when component (A-3) is added in a large amount at Step 2, it is difficult to compound with component (A) and others, and thereby bleeds out. In this case, not only is productivity deteriorated, but also the resultant resin composition cannot exhibit sufficient properties because of poor dispersibility of component (A-3). Therefore, it is preferable to compound component (A-3) in as much amount as possible at Step 1. Specifically, the amount of component (A-3) to be compounded at Step 1 is preferably 70% or more, more preferably 80% or more, further more preferably 90% or more, most preferably 95% or more, based on the whole amount of component (A-3) used.

The temperature of a heating cylinder at Step 2 is adjusted to 200 to 320° C., preferably 220 to 300° C., more preferably 245 to 280° C. The degassing is conducted according to the same method as in Step 1. Since residual volatile components are removed during the pre-compounding, the degassing at Step 2 is conducted as needed. For further improvement of the light-discoloration resistance, it is preferable not to conduct degassing when possible. The degassing is conducted at the absolute pressure of 300 hPa or more, more preferably 600 hPa or more, further more preferably 900 hPa or more. According to the production process as described above, the pre-mixture and components (B) and (C) can be melt compounded even at 300° C. or lower. As a result, volatility of components (B) and (C) is restrained so that the resin composition excellent in light-discoloration resistance can be obtained.

EXAMPLES

The present invention will be described with reference to the following Examples and Comparative Examples, which should not be construed as limiting the scope of the present invention.

The components used in the Examples and Comparative Examples are as follows.

(A-1) Polyphenylene Ether (PPE)
  Poly(2,6-dimethyl-1,4-phenylene)ether whose reduction viscosity is 0.48 dl/g as measured using a chloroform solution having a temperature of 30° C.
(A-2) Rubber-Reinforced Polystyrene (HIPS)
  High impact polystyrene (trade name: H9302; manufactured by PS Japan Corporation)
(A-3) Phosphoric Ester
  FR1: Condensed phosphoric ester (trade name: CR-741; manufactured by Daihachi Chemical Industry Co., Ltd.)
  FR2: Condensed phosphoric ester (trade name: CR-733S; manufactured by Daihachi Chemical Industry Co., Ltd.)
  FR3: Condensed phosphoric ester (trade name: TPP; manufactured by Daihachi Chemical Industry Co., Ltd.)
  In the Tables, (A-1') indicates the (A-1) component to be added at Step 1, and (A-1") indicates the (A-1) component to be added at Step 2;
  (A-2') indicates the (A-2) component to be added at Step 1, and (A-2") indicates the (A-2) component to be added at Step 2; and
  (A-3') indicates the (A-3) component to be added at Step 1, and (A-3") indicates the (A-3) component to be added at Step 2.
(B) Hindered Amine Light Stabilizer (HALS)
  Bis(2,2,6,6-tetramethyl-4-piperidyl)sebacate (trade name: JF-90; manufactured by Johoku Chemical Co., Ltd.)
(C) Ultraviolet [UV] Absorber (BTA)
  2-(2'-hydroxy-5'-methylphenyl)benzotriazole (trade name: JF-77-P; manufactured by Johoku Chemical Co., Ltd.)
(D) Polyolefin (Tafmer)
  Ethylene-,,-olefin copolymer (trade name: Tafmer P-0680; manufactured by Mitsui Chemicals, Inc.)
(E) Styrene Block Copolymer (HTR)
  Styrene block copolymer having a number average molecular weight of about 80,000, which contains two polymerized styrene blocks, each having a number average molecular weight of about 24,000, configuration represented by S—B—S—B wherein a 1,2-vinyl bond content is 36%, and butadiene units having a hydrogenation rate of 98%
(F) Epoxidized Soybean Oil
  Epoxidized soybean oil having an oxirane oxygen content of 6.3% or more (trade name: KAPOX S-6; manufactured by Kao Corporation)

Properties of compositions produced in the Examples and Comparative Examples were measured and evaluated by the following methods.

(1) Unmelted Portion

First, pellets obtained from the resin composition were molded into plate-like pieces having a size of 220 mm×220 mm and a thickness of 1 mm using a compression molding machine YSR-10 (manufactured by SHINTO METAL INDUSTRIES, LTD.) at 250° C. Secondly, the resultant plate-like pieces were formed into a box shape having a size of 200 mm×200 mm×150 mm using a vacuum molding machine manufactured by NIPPON DENKI CO., LTD. under the condition that a forming temperature and a molding rate were adjusted so that the bottom of the box becomes a thin wall having a thickness of 0.03 to 0.1 mm. The thin-walled bottom of the box-shaped molded article was cut out to be a thin film having a size of 200 mm×200 mm and a thickness of 0.03 to 0.1 mm. Unmelted portions of polyphenylene ether in the film were visually counted. Films containing the unmelted polyphenylene ether portion in 10 or less are defined as good. Those containing the unmelted polyphenylene ether portion in 10 to 30 as fair. Those containing the unmelted polyphenylene ether portion in 30 or more as poor.

(2) Bleed Out

It was determined by visual observation whether extrusion of strands was stably conducted. A resin composition exhibiting good extrusion stability without causing leak of liquid material from the dice part of an extruder and that exhibiting a little inferior extrusion stability are defined as good and fair, respectively. A resin composition causing leak of liquid material from the dice part of an extruder or causing cut of strand thereby is defined as poor.

(3) Light-Discoloration Resistance

Using a plain plate with a size of 50 mm×90 mm×2.5 mm prepared by injection molding, a 400-hour accelerated light-discoloration resistance test was conducted under the following conditions with Xenon Weather-Ometer® manufactured by Atlas Material Testing Technology, LLC.

| Test method: | ASTM D4459 |
|---|---|
| Temperature of black panel: | 55° C. |
| Temperature of chamber: | 45° C. |
| Relative humidity: | 55% |
| Irradiance level (340 nm or less): | 0.30 W/m$^2$ |
| Filter structure of xenon lamp: | Borosilicate (inner)/Sodalime (outer) |

Color (L*, a*, b*) of the plain plate subjected to the light-discoloration resistance test was measured using a spectrophotometrical colorimetry COLOR METER ZE 2000 manufactured by NIPPON DENSHOKU INDUSTRIES CO., LTD. Color-difference between the tested plate and an untested plate (ΔE*ab) was calculated according to the color-difference formula in conformity to criteria of the International Commission on Illumination (CIE).

(4) Charpy Impact Strength (Notched)

The Charpy impact strength was measured in accordance with ISO-179.

(5) HDT (Flatwise)

HDT was measured under 1.80 Pa in accordance with ISO-75-2.

(6) Flame Retardancy

The flame retardancy was classified on the basis of the vertical burning test UL94 (the standard defined by Underwriters Laboratories Inc., USA). The measurement was conducted using an injection-molded specimen having a length of 127 mm, a width of 12.7 mm and a thickness of 2.0 mm. Five (5) samples were prepared per each of the obtained resin compositions and subjected to the test to determine the class. The outline of criteria for classification is as described below. Other details are in accordance with the UL94 standard.

V-0: Average burning time of 5 seconds or less, maximum burning time of 10 seconds or less, and no burning drippings V-1: Average burning time of 25 seconds or less, maximum burning time of 30 seconds or less, and no burning drippings V-2: Average burning time of 25 seconds or less, maximum burning time of 30 seconds or less, and burning drippings observed HB: Unclassified in the above 3 classes, or burning of a clamp holding a specimen.

The average burning time (seconds) is an average of burning times of each of the five specimen. The burning time means a time that a specimen took from being ignited until quenched. The maximum burning time (seconds) is the longest burning time of each of the five specimen. The ignition was conducted twice for each specimen, that is, 10 times in total.

(7) Self Tapping Property

A plain plate with a boss having a thickness of 3 mm, an inner diameter of 3.6 mm, a height of 8.0 mm was injection molded. A 4 mm tapping screw was screwed into the hole of the boss with a tightening torque of 0.98 N·m. Screwing was repeated with increasing the tightening torque by 0.1 N·m until the tapping screw span free. The self tapping property was the value of the tightening torque (N·m) up to the screw driver span free.

(8) Deposit on the Mold Surface at Molding

Plain plates having a size of 50 mm×90 mm×2.5 mm were molded by continuous short-shot molding at a heating cylinder temperature of 260° C. and a mold temperature of 50° C., and then a plain plate having the same size was molded by full-shot molding. The mold surface after the full-shot molding was visually observed. The case almost no deposit was observed was defined as good, the case few observed fair, and the case many observed poor.

(9) Black-Colored Impurity

Pellets obtained from the resin composition were molded into a disk having a diameter of 200 mm and a thickness of 1 mm using a compression molding machine YSR-10 manufactured by SHINTO METAL INDUSTRIES, LTD., of which temperature was preset at 250° C. It was visually observed whether carbonized particles (black-colored impurity) remained. The case almost no black-colored impurities were observed was defined as good, the case few observed fair, and the case many observed poor.

(10) Silver Streak

A plain plate having a size of 50 mm×90 mm×2.5 mm was molded at a heating cylinder temperature of 280° C. and a mold temperature of 50° C. to observe visually silver streaks appearing radially on the surface of the plain plate. The case almost no silver streaks was observed was defined as good, the case few observed fair, and the case many observed poor.

(11) Mold Releasability

When a specimen was molded, it was observed visually how the specimen and a runner were easily released from the mold. The case the specimen and runner were released easily was defined as good, less easily as fair, and hardly released as poor.

Examples 1 to 9

At Step 1, a composition comprising the above-mentioned components, i.e., component (A-1'), component (A-2') and tris-(2,4-di-t-butylphenyl)phosphite as a stabilizer, was fed through a first feed port located upstream of streamline to a twin-screw extruder equipped with a pressure reducing vent and a screw having a diameter of 40 mm wherein the maximum temperature of the heating cylinder was preset at 320° C. Then, while the composition was melt compounded at the screw revolution rate of 300 rpm under the absolute pressure of 100 hPa, the component (A-3') was fed through a nozzle to the side of the extruder using a gear pump. The extruded strand was cooled and cut into pieces, thereby obtaining a pre-mixture (A). At Step 2, the pre-mixture (A), components (A-2"), (B), (C), (D), (E), and (F) were blended. The amount of each component was shown in Table 1.

To the above-obtained composition, 3 parts by weight of titanium dioxide as a colorant and 0.15 parts by weight of polytetrafluoroethylene as a drip inhibitor were added. These components were fed into a single-screw extruder having a screw diameter of 40 mm wherein the maximum temperature of the heating cylinder and the absolute pressure were preset as shown in Table. Then, the composition was melt compounded at the screw revolution rate of 150 rpm. The extruded strand was cooled and cut into pieces, thereby obtaining pellets of the resin composition. Next, the resultant pellets of the resin composition were measured and evaluated by the above-mentioned methods. The results are shown in Table 1.

Example 10

An experiment was conducted under the same condition as in Example 1 except that the amount of component (A-2') at Step 1 was changed. The results of the measurement and evaluation of the resin composition pellets are shown in Table 1.

Comparative Examples 1 to 5

A composition comprising the above-mentioned components, i.e., the components (A-1"), (A-2"), (B), and (C), 0.3 parts by mass of tris-(2,4-di-t-butylphenyl) phosphite as a stabilizer, 3 parts by mass of titanium dioxide as a colorant, and 0.15 parts by mass of polytetrafluoroethylene as a drip inhibitor, were fed through the first feed port located upstream of streamline to a twin-screw extruder equipped with a pressure reducing vent and a screw having a diameter of 40 mm wherein the maximum temperature and absolute pressure of the heating cylinder were preset as shown in Table 2. Then, while the composition was melt compounded at the screw revolution rate of 300 rpm, component (A-3") was fed through a nozzle to the side of an extruder using a gear pump. The extruded strand was cooled and cut into pieces, thereby obtaining pellets of a resin composition. Next, pellets obtained from the resin composition were measured and evaluated by the above-mentioned methods. The results are shown in Table 2. The amounts of each component added are also shown in Table 2.

Comparative Example 6

An experiment was conducted under the same condition as in Example 9 except that the amount of component (B) was changed and component (C) was not added. The results of the measurement and evaluation of the resin composition pellets are shown in Table 2.

Comparative Example 7

An experiment was conducted under the same condition as in Example 9 except that component (B) was not added and the amount of component (C) was changed. The results of the measurement and evaluation of the resin composition pellets are shown in Table 2.

Comparative Example 8

An experiment was conducted under the same condition as in Example 1 except that the amount of component (A-3') was not added at Step 1 and component (A-3") was added at Step 2. The results of the measurement and evaluation of the resin composition pellets are shown in Table 2.

Example 11

An experiment was conducted under the same condition as in Example 1 except that the amounts of components (A-1'), (A-2'), and (A-3') were changed at Step 1. The results of the measurement and evaluation of the resin composition pellets are shown in Table 3.

Comparative Example 9

An experiment was conducted under the same condition as in Comparative Example 1 except that the amounts of components (A-1"), (A-2"), and (A-3") were changed. The results of the measurement and evaluation of the resin composition pellets are shown in Table 3.

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Step 1 | [Extrusion condition] | | | | | | | | | | | |
| | Temperature | (° C.) | 320 | 320 | 320 | 320 | 320 | 320 | 320 | 320 | 320 | 320 |
| | Absolute pressure | (hPa) | 100 | 100 | 100 | 100 | 100 | 100 | 100 | 100 | 100 | 100 |
| | (A-1') PPE | (part by mass) | 30 | 30 | 30 | 30 | 30 | 30 | 30 | 30 | 30 | 30 |
| | (A-2') HIPS | (part by mass) | 28 | 28 | 28 | 28 | 28 | 28 | 28 | 28 | 28 | 35 |
| | (A-3') FR1 | (part by mass) | 21 | 21 | 21 | 21 | | | 21 | 21 | 21 | 21 |
| | FR2 | (part by mass) | | | | | 21 | | | | | |
| | FR3 | (part by mass) | | | | | | 21 | | | | |
| Step 2 | [Extrusion condition] | | | | | | | | | | | |
| | Temperature | (° C.) | 270 | 270 | 300 | 320 | 270 | 270 | 270 | 270 | 270 | 270 |
| | Absolute pressure | (hPa) | 900 | 300 | 900 | 900 | 900 | 900 | 900 | 900 | 900 | 900 |
| | (A) Pre-mixture | (part by mass) | 79 | 79 | 79 | 79 | 79 | 79 | 79 | 79 | 79 | 86 |
| | (A-1") PPE | (part by mass) | | | | | | | | | | |
| | (A-2") HIPS | (part by mass) | 42 | 42 | 42 | 42 | 42 | 42 | 42 | 42 | 42 | 35 |
| | (A-3") FR1 | (part by mass) | | | | | | | | | | |
| | (B) HALS | (part by mass) | 0.8 | 0.8 | 0.8 | 0.8 | 0.8 | 0.8 | 0.8 | 0.8 | 0.8 | 0.8 |
| | (C) BTA | (part by mass) | 0.4 | 0.4 | 0.4 | 0.4 | 0.4 | 0.4 | 0.4 | 0.4 | 0.4 | 0.4 |
| | (D) Tafmer | (part by mass) | | | | | | | | 0.6 | 1.2 | 1.2 |
| | (E) HTR | (part by mass) | | | | | | | | | 1.2 | 1.2 |
| | (F) Epoxidized soybean oil | (part by mass) | | | | | | | | | | 0.6 |

TABLE 1-continued

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| (Extrudability) | | | | | | | | | | |
| Unmelted portion | Good | Good | Good | Good | Good | Good | Good | Good | Good | Good |
| Bleed-out | Good | Good | Good | Good | Good | Good | Good | Good | Good | Good |
| (Light-discoloration resistance: ΔE*ab) | | | | | | | | | | |
| 300 hrs | 3.1 | 3.9 | 3.4 | 4.4 | 3.0 | 3.4 | 3.1 | 3.2 | 1.2 | 3.2 |
| 400 Hrs | 7.2 | 8.6 | 7.7 | 8.9 | 7.4 | 7.3 | 7.3 | 7.4 | 4.9 | 7.3 |
| Charpy (kJ/m$^2$) | 12.0 | 12.0 | 11.8 | 11.2 | 12.4 | 14.0 | 12.3 | 16.4 | 16.2 | 11.2 |
| HDT (° C.) | 72 | 73 | 72 | 72 | 69 | 65 | 72 | 72 | 71 | 72 |
| Flame retardancy | V-1 | V-1 | V-1 | V-1 | V-1 | V-1 | V-1 | V-1 | V-1 | V-1 |
| Self-tapping property (N·m) | 2.3 | 2.3 | 2.3 | 2.3 | 1.9 | 1.8 | 2.3 | 2.4 | 2.4 | 2.3 |
| MD | Good | Good | Good | Good | Good | Poor | Good | Good | Good | Good |
| Black-colored impurity | Good | Good | Good | Good | Poor | Good | Good | Good | Good | Good |
| Silver streak | Good | Good | Good | Good | Good | Fair | Good | Good | Good | Good |
| Mold releasing property | Fair | Fair | Fair | Fair | Fair | Fair | Good | Good | Good | Fair |

TABLE 2

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Step 1 | [Extrusion condition] | | | | | | | | |
|  | Temperature (° C.) |  |  |  |  |  | 320 | 320 | 320 |
|  | Absolute pressure (hPa) |  |  |  |  |  | 100 | 100 | 100 |
|  | (A-1') PPE (part by mass) | 30 | 30 | 30 | 30 | 30 | 30 | 30 | 30 |
|  | (A-2') HIPS (part by mass) | 28 | 28 | 28 | 28 | 28 | 28 | 28 | 28 |
|  | (A-3') FR1 (part by mass) |  |  |  |  |  | 21 | 21 |  |
| Step 2 | [Extrusion condition] | | | | | | | | |
|  | Temperature (° C.) | 270 | 300 | 320 | 270 | 320 | 270 | 270 | 270 |
|  | Absolute pressure (hPa) | 100 | 100 | 100 | 900 | 900 | 900 | 900 | 900 |
|  | (A) Pre-mixture (part by mass) |  |  |  |  |  | 79 | 79 | 58 |
|  | (A-1″) PPE (part by mass) | 30 | 30 | 30 | 30 | 30 |  |  |  |
|  | (A-2″) HIPS (part by mass) | 70 | 70 | 70 | 70 | 70 | 42 | 42 | 42 |
|  | (A-3″) FR1 (part by mass) | 21 | 21 | 21 | 21 | 21 |  |  | 21 |
|  | (B) HALS (part by mass) | 0.8 | 0.8 | 0.8 | 0.8 | 0.8 | 1.2 |  | 0.8 |
|  | (C) BTA (part by mass) | 0.4 | 0.4 | 0.4 | 0.4 | 0.4 |  | 1.2 | 0.4 |
|  | (D) Tafmer (part by mass) |  |  |  |  |  |  | 1.2 |  |
|  | (E) HTR (part by mass) |  |  |  |  |  | 1.2 | 1.2 |  |
|  | (F) Epoxidized soybean oil (part by mass) |  |  |  |  |  | 0.6 | 0.6 |  |
| (Extrudability) | | | | | | | | | |
| Unmelted portion | | Poor | Poor | Fair | Poor | Fair | Good | Good | Good |
| Bleed-out | | Fair | Fair | Fair | Fair | Fair | Good | Good | Poor |
| (Light-discoloration resistance: ΔE*ab) | | | | | | | | | |
| 300 hrs | | 5.2 | 5.6 | 6.1 | 4.1 | 5.1 | 3.9 | 3.0 | 4.2 |
| 400 Hrs | | 9.4 | 9.9 | 10.4 | 8.5 | 9.4 | 8.4 | 7.3 | 8.9 |
| Charpy (kJ/m$^2$) | | 9.7 | 9.3 | 8.2 | 9.6 | 8.4 | 16.0 | 16.1 | 8.4 |
| HDT (° C.) | | 70 | 71 | 70 | 70 | 71 | 71 | 70 | 73 |
| Flame retardancy | | HB | HB | HB | HB | HB | V-1 | V-1 | HB |
| Self-tapping proprety (N·m) | | 2.1 | 2.1 | 2.0 | 2.1 | 2.2 | 2.4 | 2.4 | 2.2 |
| MD | | Good | Good | Good | Good | Good | Good | Fair | Good |
| Black-colored impurity | | Good | Good | Good | Good | Good | Good | Good | Good |
| Silver streak | | Fair | Fair | Good | Poor | Poor | Good | Good | Good |
| Mold releasing property | | Fair | Fair | Fair | Fair | Fair | Good | Good | Fair |

TABLE 3

|  |  |  | Ex. 11 | Comp. Ex. 9 |
|---|---|---|---|---|
| Step 1 | [Extrusion condition] | | | |
|  | Temperature | (° C.) | 320 | — |
|  | Absolute pressure | (hPa) | 100 | — |
|  | (A-1') PPE | (part by mass) | 44 |  |
|  | (A-2') HIPS | (part by mass) | 25 |  |
|  | (A-3') FR1 | (part by mass) | 25 |  |
| Step 2 | [Extrusion conditon] | | | |
|  | Temperature | (° C.) | 270 | 270 |
|  | Absolute pressure | (hPa) | 900 | 100 |
|  | (A) Pre-mixture | (part by mass) | 94 |  |
|  | (A-1″) PPE | (part by mass) |  | 44 |
|  | (A-2″) HIPS | (part by mass) | 31 | 56 |
|  | (A-3″) FR1 | (part by mass) |  | 25 |
|  | (B) HALS | (part by mass) | 0.9 | 0.9 |
|  | (C) BTA | (part by mass) | 0.4 | 0.4 |

TABLE 3-continued

|  |  | Ex. 11 | Comp. Ex. 9 |
|---|---|---|---|
| (Extrudability) |  |  |  |
| Unmelted portion |  | Good | Poor |
| Bleed-out |  | Good | Fair |
| (Light-discoloration resistance: ΔE*ab) |  |  |  |
| 300 hrs |  | 5.9 | 6.9 |
| 400 Hrs |  | 10.9 | 12.1 |
| Charpy | (kJ/m$^2$) | 13.3 | 11.9 |
| HDT | (° C.) | 77 | 77 |
| Flame retardancy |  | V-0 | V-1 |
| Silver streak |  | Good | Fair |

INDUSTRIAL APPLICABILITY

The resin composition of the present invention is excellent in light-discoloration resistance, friendly to the environment, and suitable for parts of home appliances and office equipment. In general, a flame-retardant resin colored in a bright color, such as light gray or ivory, is used for a housing of an office equipment such as a copy machine, a multiple copy machine, a printer, a fax machine, and a personal computer, or a television. Therefore, the resin composition of the present invention is particularly suitable material for such light-colored application.

Further, an inorganic filler such as a glass fiber, a glass flake, kaolin clay, or talc, or a fibrous reinforcing agent can be incorporated into the polyphenylene ether composition of the present invention to obtain a high strength material having excellent fluidity and heat resistance.

What is claimed is:

1. A production process of polyphenylene ether composition comprising:
   (A-1) a polyphenylene ether,
   (A-2) a polystyrene,
   (A-3) an ester phosphate,
   (B) a hindered amine light stabilizer, and
   (C) an ultraviolet absorber;
   which process comprises the steps of:
   Step 1: melt compounding the component (A-1), (A-2') a part of the component (A-2), and the component (A-3) to obtain (A) a pre-mixture; and
   Step 2: melt compounding the pre-mixture (A), (A-2") the rest of the component (A-2), and the components (B) and (C).

2. The production process of polyphenylene ether composition according to claim 1, which composition contains the following components in the amount below based on 100 parts by mass of the total of the components (A-1) and (A-2):
   (A-1) 10 to 45 parts by mass,
   (A-2) 55 to 90 parts by mass,
   (A-3) 2 to 35 parts by mass,
   (B) 0.03 to 5 parts by mass, and
   (C) 0.01 to 3 parts by mass.

3. The production process of polyphenylene ether composition according to claim 1, wherein the mass ratio of the component (A-1) to the component (A-2') at Step 1 is from 46/54 to 90/10.

4. The production process of polyphenylene ether composition according to claim 1, wherein the melt compounding at Step 2 is conducted at the absolute pressure of 300 hPa or more, while degassing.

5. The production process of polyphenylene ether composition according to claim 1, wherein the temperature of a heating cylinder at Step 2 is adjusted to 200 to 320° C.

6. The production process of polyphenylene ether composition according to claim 1, wherein the component (A-3) is a condensed ester phosphate represented by the following formulae (I) or (II):

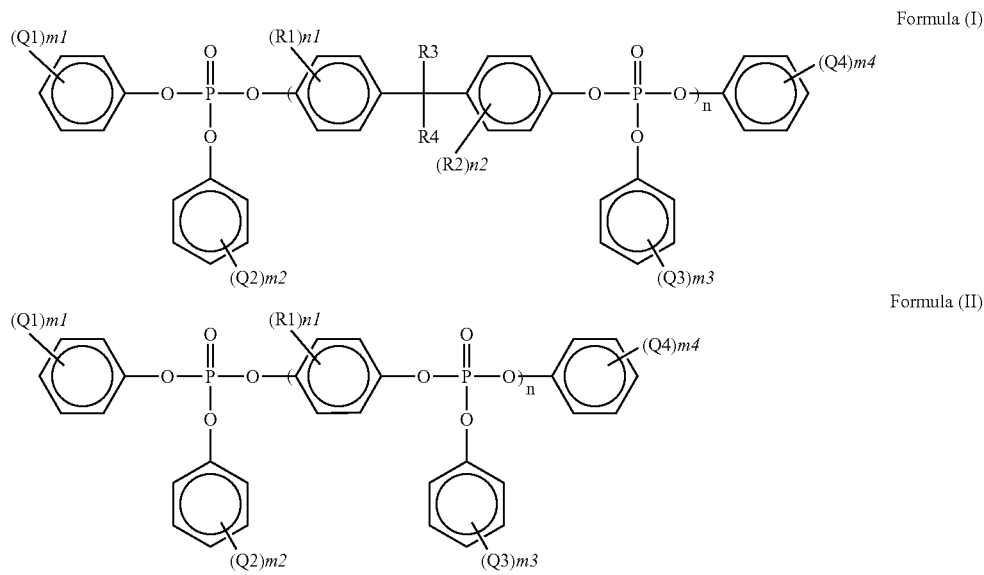

wherein each of Q1, Q2, Q3 and Q4 is a substituent and independently represents an alkyl group having 1 to 6 carbon atoms; each of R1 and R2 independently represents a methyl group; each of R3 and R4 independently represents a hydrogen atom or a methyl group; n is an integer of 1 or more; each of n1 and n2 independently represents an integer of 0 to 2; and each of m1, m2, m3 and m4 independently represents an integer of 0 to 3.

7. The production process of polyphenylene ether composition according to claim 1, further comprising 0.1 to 5 parts by mass of (D) a polyolefin based on 100 parts by mass of the total of the components (A-1) and (A-2).

8. The production process of polyphenylene ether composition according to claim 7, wherein the component (D) is an ethylene-propylene copolymer.

9. The production process of polyphenylene ether composition according to claim 1, further comprising 0.1 to 5 parts by mass of (E) a styrene block copolymer based on 100 parts by mass of the total of the components (A-1) and (A-2).

10. The production process of polyphenylene ether composition according to claim 1, further comprising 0.1 to 3 parts by mass of (F) an epoxidized soybean oil based on 100 parts by mass of the total of the components (A-1) and (A-2).

11. The production process of polyphenylene ether composition according to claim 1, wherein the mass ratio of the component (B) to the component (C) is 70/3 0 to 95/5 and the total of the components (B) and (C) is 0.05 to 5 parts by mass based on 100 parts by mass of the total of the components (A-1) and (A-2).

12. The production process of polyphenylene ether composition according to claim 1, further comprising 1.0 to 10 parts by mass of a titanium dioxide based on 100 parts by mass of the total of the components (A-1) and (A-2).

13. A molded article formed from the polyphenylene ether composition produced by the process of claim 1.

14. A television housing formed from the polyphenylene ether composition produced by the process of claim 1.

15. A office equipment housing formed from the polyphenylene ether composition produced by the process of claim 1.

16. Any one of housings for a printer, a fax machine, a copy machine and a multiple copy machine formed from the polyphenylene ether composition produced by the process of claim 1.

17. The production process of polyphenylene ether composition according to claim 4, wherein the melt compounding at Step 1 is conducted at the absolute pressure of 600 hPa or less, while degassing.

18. The production process of polyphenylene ether composition according to claim 5, wherein the temperature of a heating cylinder at Step 1 is adjusted to 280 to 370°0 C.

* * * * *